UNITED STATES PATENT OFFICE.

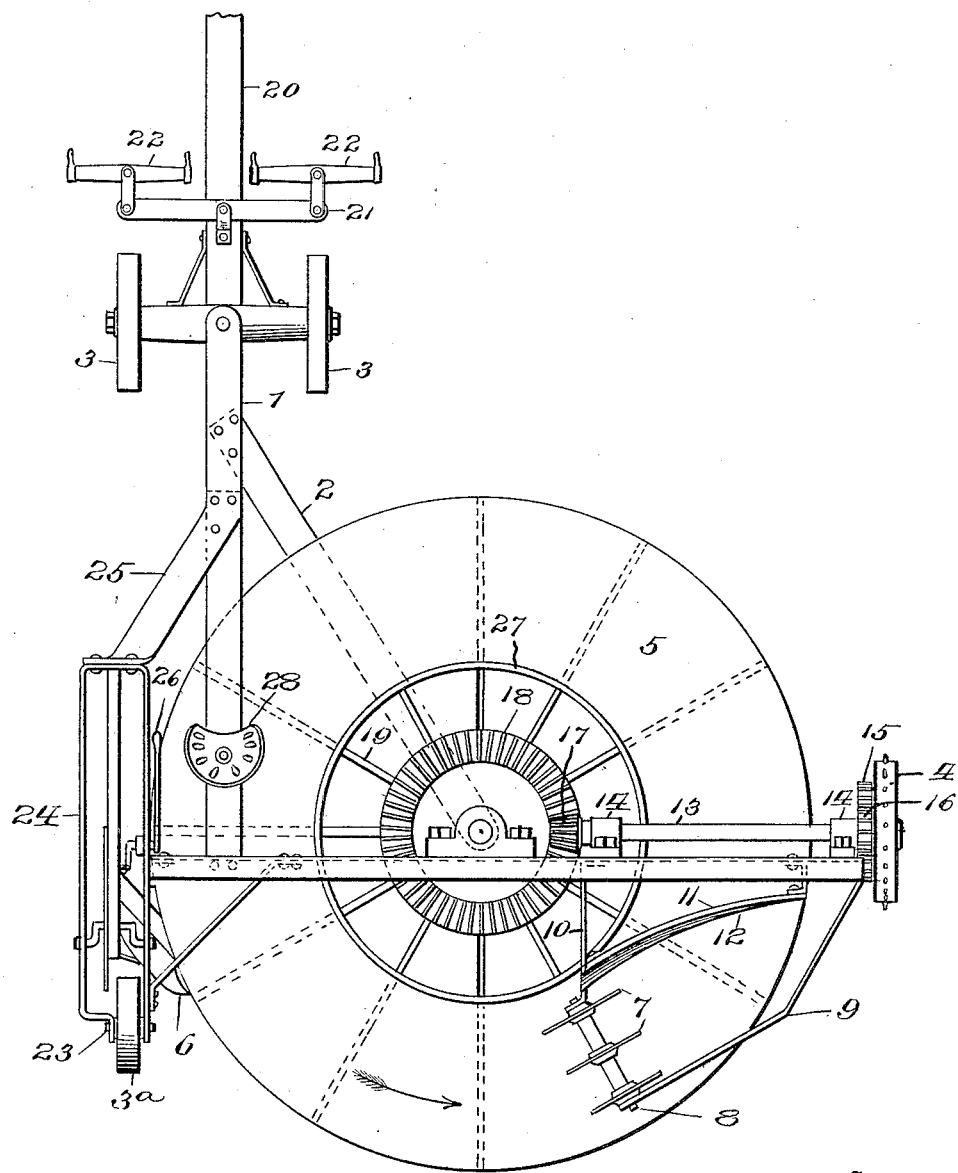

CRENO P. BETTENGA, OF WADENA, MINNESOTA.

ROTARY ROAD-GRADER.

1,131,902.　　　　　Specification of Letters Patent.　　Patented Mar. 16, 1915.

Application filed November 7, 1913. Serial No. 799,723.

*To all whom it may concern:*

Be it known that I, CRENO P. BETTENGA, a citizen of the United States, residing at Wadena, in the county of Wadena and State of Minnesota, have invented certain new and useful Improvements in Rotary Road-Graders; and I do hereby declare the following to be a full, clear, and exact description of the invention, such as will enable others skilled in the art to which it appertains to make and use the same.

My invention relates to certain new and useful improvements in road graders, and has for its object to provide a grader of simple and inexpensive construction which shall be, at the same time thoroughly practical and durable in operation, and which shall upon the removal of material from the road bed, deposit the same upon a rotating platform where it shall be disintegrated and subsequently delivered from said platform to any desired locality.

With these ends in view my invention consists in the details of construction and arrangement hereinafter more fully set forth.

In order that those skilled in the art to which my invention appertains may know how to make and use the same, I will proceed to describe the same, referring by numerals to the accompanying drawing in which the drawing shows a top or plan view of a grader embodying the features of my invention.

Similar reference numerals indicate like parts in the drawing.

1, represents a frame of substantially L-form, braced as shown at 2 mounted upon two forward wheels 3, a rear wheel 3ª and a rear traction wheel 4. Upon the frame 1 is mounted a rotating table 5, and plow 6 and also a sod-breaker or earth disintegrator, consisting of a series of circular knives 7 mounted upon a shaft 8, journaled in the ends of suitable arms 9, 10 and 11 secured at one end to the frame 1, and a scraper 12, rigidly connected with the frame serves to scrape off the earth, etc., as the table is rotated in an obvious manner. The supporting shaft or axle 13 of the traction wheel 4, is connected with the frame 1, by suitable bearings 14, and a gear 15 fixed to the wheel 4 meshing with the pinion 16 on the axle. The inner end of the axle 13, is provided with a beveled pinion 17, meshing with a horizontal gear 18 connected with the rotating table 5, by radial arms 19.

From this construction and arrangement, it will be seen that as the grader is moved forward the traction of wheel 4 will cause the table 5 to be rotated in the direction indicated by the arrow, and that the frictional contact of the circular knives 7, with the table 5, will cause them to rotate upon their shaft 8 and break any sod or disintegrate any earth deposited upon the table. The forward end of the frame 1, is pivotally connected by an ordinary king pin with the axle of the front wheels 3, and to this axle is connected a pole 20, double tree 21, and swingle trees 22. The rear wheel 3ª is mounted upon an axle 23, journaled in a frame 24 suitably secured to the rear portion of the frame 1, and to its forward right angled portion by an angle brace 25.

The plow 6, is mounted upon the frame 24, in such relation to the rotating table 5 that the sod or earth lifted by the plow will through the medium of its moldboard deposit the sod or earth upon the rotating table which during its movement in the direction of the arrow is first cut up and disintegrated by the knives 7, and finally removed from the table by the stationary scraper 12. The plow is adapted to be raised and lowered as occasion may demand by a hand lever 26, suitably connected with the plow hanger.

From the construction, arrangement and operation of my improved road grader it will be readily understood that I am enabled to remove from the surface of the road at any particular locality any excess of vertical profile and deposit the same upon the rotating table, and as the machine can be guided and drawn to any given locality, the material taken from the surface and delivered upon the table can be scraped off and deposited at any suitable place. It will also be seen that my improved grader is not only simple and of inexpensive construction but that it is also strong and durable and not liable to get out of order.

The rotating table 5 supported and rigidly mounted upon the radial spokes 19, is preferably formed at its inner circumference with a guard 27, to prevent the material deposited upon said table from drifting inwardly and causing it to be positively carried to the scraper 12. An ordinary driver's seat 28, is erected upon the frame 1, at any desired locality with reference to the draft team.

Having described the construction and operation of my improved road grader what I claim as new and desire to secure by Letters Patent is:

In a rotary road grader, an L-shaped frame supported on carrying wheels and a traction wheel, a rotary table mounted to revolve on the frame, means positively operated by the traction wheel to rotate the rotary table, a plow arranged to deposit earth upon the rotary table, a scraper arranged to contact with the upper surface of the rotary table to discharge earth, and rotary disintegrating cutters independently mounted on the frame in contact with the upper surface of the rotary table between the plow and the scraper.

In testimony whereof, I have signed my name to this specification in the presence of two subscribing witnesses.

CRENO P. BETTENGA.

Witnesses:
W. E. PARKER,
GEO. E. HARRIS.

Copies of this patent may be obtained for five cents each, by addressing the "Commissioner of Patents, Washington, D. C."